United States Patent
Wu (10) Patent No.: US 9,436,137 B2
(45) Date of Patent: Sep. 6, 2016

(54) INTERMEDIATE TRANSFER MEMBERS

(71) Applicant: Xerox Corporation, Norwalk, CT (US)

(72) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 48 days.

(21) Appl. No.: 14/529,381

(22) Filed: Oct. 31, 2014

(65) Prior Publication Data

US 2016/0124351 A1    May 5, 2016

(51) Int. Cl.
| | |
|---|---|
| *C08K 5/521* | (2006.01) |
| *C08L 79/08* | (2006.01) |
| *C08K 3/04* | (2006.01) |
| *G03G 15/16* | (2006.01) |

(52) U.S. Cl.
CPC .............. *G03G 15/162* (2013.01); *C08K 3/04* (2013.01); *C08K 5/521* (2013.01); *C08L 79/08* (2013.01); *C08K 2201/001* (2013.01)

(58) Field of Classification Search
None
See application file for complete search history.

(56) References Cited

U.S. PATENT DOCUMENTS

| | | | |
|---|---|---|---|
| 5,487,707 A | 1/1996 | Sharf et al. | |
| 6,139,784 A | 10/2000 | Oshima et al. | |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,602,156 B2 | 8/2003 | Schlueter, Jr. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 8,197,937 B2 * | 6/2012 | Wu ...................... | C08G 65/007 399/297 |
| 9,120,903 B2 * | 9/2015 | Wu ......................... | C08J 3/005 |
| 9,217,969 B2 * | 12/2015 | Wu .................... | G03G 15/2057 |
| 2010/0247918 A1 * | 9/2010 | Wu ...................... | C08G 65/007 428/411.1 |
| 2012/0052306 A1 * | 3/2012 | Wu ......................... | C08L 79/08 428/421 |
| 2012/0163881 A1 * | 6/2012 | Wu ...................... | G03G 15/162 399/313 |
| 2012/0264969 A1 * | 10/2012 | Wu ......................... | C07C 69/28 560/182 |
| 2014/0234545 A1 * | 8/2014 | Wu .................... | G03G 15/2057 427/385.5 |

* cited by examiner

*Primary Examiner* — Robert C Boyle
*Assistant Examiner* — Stephen Rieth
(74) *Attorney, Agent, or Firm* — Eugene O. Palazzo (57) ABSTRACT

An intermediate transfer member that contains a mixture of a polyimide, an optional conductive component, and a fluoroaliphatic phosphate.

21 Claims, 1 Drawing Sheet

INTERMEDIATE TRANSFER MEMBERS

BACKGROUND

Various intermediate transfer members, such as intermediate transfer belts selected for transferring a developed image in xerographic systems, are known. For example, there are known a number of intermediate transfer members that include materials of a low unacceptable modulus or break strength, poor release characteristics from metal substrates, and which members are costly to prepare primarily because of the cost or scarcity of raw materials and lengthy drying times. Also known are intermediate transfer members with characteristics that cause these members to become brittle resulting in inadequate acceptance of the developed image and subsequent partial transfer of developed xerographic images to a substrate like paper.

A disadvantage relating to the preparation of an intermediate transfer member is that there is usually deposited on a metal substrate a separate release layer, and thereafter, there is applied to the release layer the intermediate transfer member components, and where the release layer allows the resultant intermediate transfer member to be separated from the metal substrate by peeling or by the use of mechanical devices. Thereafter, the intermediate transfer member is in the form of a film, which can be selected for xerographic imaging systems, or the film can be deposited on a supporting substrate such as a polymer layer. The use of a release layer adds to the cost and time of preparation, and such a layer can modify a number of the intermediate transfer member characteristics.

Additionally, with a number of known intermediate transfer members there are usually required three separate components of a release additive, a leveling additive and a dispersing agent, which independent components have a number of process challenges, which add to the costs of the members, and where the additives and agents selected are not readily soluble in common solvents.

There is a need for intermediate transfer members that substantially avoid or minimize the disadvantages of a number of known intermediate transfer members.

Further, there is a need for intermediate transfer members where a single component, soluble in a number of solvents, can function as a release additive, a leveling agent, and a dispersant.

Yet further there is a need for intermediate transfer members where there is utilized a single fluoroaliphatic phosphate component that simultaneously functions as a release additive, a leveling additive and a dispersing agent, and which component is readily soluble or dispersible in common solvents such as N-methyl pyrrolidone (NMP), thereby avoiding or minimizing coating defects and phase separation of the intermediate transfer film solution mixture and where in embodiments the single fluoroaliphatic phosphate component serves as a dispersing agent for a conductive material, such as carbon black, thus avoiding known disadvantageous milling processes for the preparation of the disclosed coating dispersion.

Also, there is a need for intermediate transfer members with excellent break strengths as determined by their modulus measurements, which are readily releasable from substrates, and possess high glass transition temperatures, and improved stability with no or minimal degradation for extended time periods.

Moreover, there is a need for intermediate transfer member materials that possess rapid release characteristics from a number of substrates that are selected when such members are prepared and that have excellent modulus properties.

Yet another need resides in providing intermediate transfer members that can be generated by flow coating processes, that can be prepared by non-milling processes, and that possess excellent surface properties.

Another need relates to providing seamless intermediate transfer members that have excellent conductivity or resistivity, and that possess acceptable humidity insensitivity characteristics leading to developed images with minimal resolution issues.

Yet there is a need for intermediate transfer members where the functionalities of a release additive, leveling agent and dispersant, or dispersing agent are accomplished by one component.

Further, there is a need for intermediate transfer members, such as belts, containing a fluoroaliphatic phosphate component that can simultaneously function as a release additive, a leveling agent, and a dispersing agent, and where a mixture that includes the fluoroaliphatic phosphate component can be economically and efficiently manufactured.

These and other needs are achievable in embodiments with the intermediate transfer members and components thereof disclosed herein.

SUMMARY

Disclosed is an intermediate transfer member comprised of a polyimide, a fluoroaliphatic phosphate, and an optional conductive component.

Also disclosed is an intermediate transfer member comprising a single layer comprised of a polyimide, carbon black, and a fluoroaliphatic phosphate of the following alternative formulas/structures wherein $R_f$ is a perfluoroalkyl of $C_nF_{2n+1}$ with n for the $C_n$ being the number of carbon substituents.

Further disclosed is an intermediate transfer member comprising in sequence a supporting substrate, a layer thereover comprised of a mixture of a polyimide generated from a polyamic acid or mixtures thereof, carbon black, and a fluoroaliphatic phosphate selected from a group consisting of perfluorohexylethyl phosphate, perfluorooctylethyl phosphate, di(perfluorohexylethyl) phosphate, di(perfluorooctylethyl) phosphate, and mixtures thereof, and wherein the member optionally possesses a Young's modulus of from about 5,000 to about 8,000 MPa.

FIGURES

The following Figures are being provided to further illustrate the intermediate transfer members disclosed herein.

EMBODIMENTS

The terms "including", "includes", "having", "has", "with", or variants thereof are intended to be inclusive in a manner similar to the term "comprising". The term "at least one of" means, for example, that one or more of the listed items can be selected.

Any disclosed numerical value inherently contains certain errors necessarily resulting from the standard deviation found in their respective testing measurements. Moreover, all ranges disclosed herein are to be understood to encompass any and all sub-ranges subsumed therein. For example, a range of from about 1 to about 10 can include any and all sub-ranges there between such as 2, 3, 4, 5, 6, 7, 8, 9, and 10, and about can include ranges below 1 and ranges above 10.

The disclosed intermediate transfer member can be comprised of a polyimide precursor, mixtures thereof that convert to a polyimide and a fluoroaliphatic phosphate, which composition self releases from a metal substrate, such as stainless steel, and where an external release layer on the metal substrate can be avoided.

Figure 1:
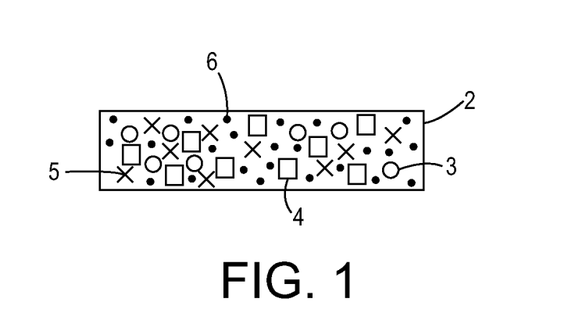
FIG. 1 illustrates an exemplary embodiment of a one-layer intermediate transfer member of the present disclosure.

In FIG. 1 there is illustrated an intermediate transfer member comprising a layer 2 comprised of a fluoroaliphatic phosphate 3, a polyimide 4, an optional siloxane polymer 5, and an optional conductive component 6.

Figure 2:
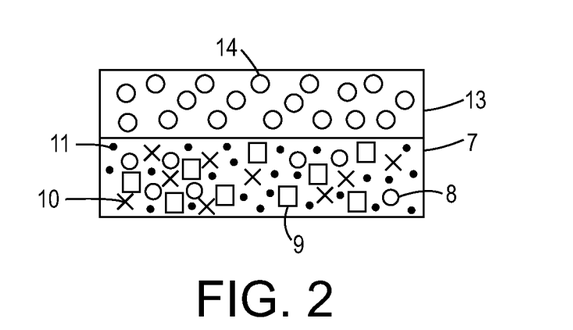
FIG. 2 illustrates an exemplary embodiment of a two-layer intermediate transfer member of the present disclosure.

In FIG. 2 there is illustrated a two-layer intermediate transfer member comprising a bottom layer 7 comprising a fluoroaliphatic phosphate 8, a polyimide 9, an optional siloxane polymer 10, and an optional conductive component 11, and an optional top or outer toner release layer 13 comprising release components 14.

Figure 3:
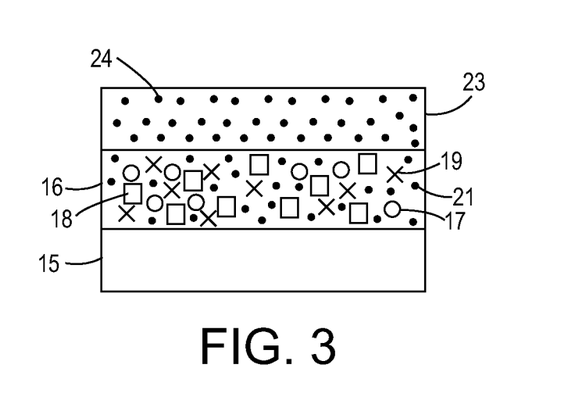
FIG. 3 illustrates an exemplary embodiment of a three-layer intermediate transfer member of the present disclosure.

In FIG. 3 there is illustrated a three-layer intermediate transfer member comprising a supporting substrate 15, a layer thereover 16 comprising a fluoroaliphatic phosphate 17, a polyimide 18, an optional siloxane polymer 19, and an optional conductive component 21, and an optional release layer 23 comprising release components 24.

Polyimides

Examples of polyimides selected for the intermediate transfer member mixtures illustrated herein can be formed from a polyimide precursor of a polyamic acid or a plurality of polyamic acids, such as from about 2 to about 10, from 2 to about 5, and from about 2 to about 3 polyamic acids, in for example, a weight percent ratio for blends of 2 polyamic acids being about 80/20, about 75/25, and about 50/50. Examples of the acids include the polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. After curing by heating the resulting polyimides include a polyimide of pyromellitic dianhydride/4,4'-oxydianiline, a polyimide of pyromellitic dianhydride/phenylenediamine, a polyimide of biphenyl tetracarboxylic dianhydride/4,4'-oxydianiline, a polyimide of biphenyl tetracarboxylic dianhydride/phenylenediamine, a polyimide of benzophenone tetracarboxylic dianhydride/4,4'-oxydianiline, a polyimide of benzophenone tetracarboxylic dianhydride/4,4'-oxydianiline/phenylenediamine, and mixtures thereof.

Commercially available examples of polyamic acids of pyromellitic dianhydride/4,4'-oxydianiline selected include PYRE-ML® RC-5019 (about 15 to 16 weight percent in N-ethyl-2-pyrrolidone, NMP), RC-5057 (about 14.5 to 15.5 weight percent in NMP/aromatic hydrocarbon, 80/20), and RC-5083 (about 18 to 19 weight percent in NMP/DMAc, 15/85), all available from Industrial Summit technology Corporation, and Parlin, N.J.; DURIMIDE® 100, commercially available from FUJIFILM Electronic Materials U.S.A., Incorporated.

Polyamic acids of biphenyl tetracarboxylic anhydride/phenylenediamine examples include U-VARNISH® A and S (about 20 weight percent in NMP), both available from UBE America Incorporated, New York, N.Y., BPDA resin (about 16.8 weight percent in NMP), available from Kaneka Corporation, TX, PI-2610 (about 10.5 weight percent in NMP), and PI-2611 (about 13.5 weight percent in NMP), both available from HD MicroSystems, Parlin, N.J.

Examples of polyamic acids of benzophenone tetracarboxylic dianhydride/4,4'-oxydianiline include RP46 and RP50 (about 18 weight percent in NMP), both available from Unitech Corp., Hampton, Va.

Polyamic acids of benzophenone tetracarboxylic dianhydride/4,4'-oxydianiline/phenylenediamine examples are PI-2525 (about 25 weight percent in NMP), PI-2574 (about 25 weight percent in NMP), PI-2555 (about 19 weight percent in NMP/aromatic hydrocarbon, weight ratio of 80/20), and PI-2556 (about 15 weight percent in NMP/aromatic hydrocarbon/propylene glycol methyl ether, weight ratio of 70/15/15), all available from HD MicroSystems, Parlin, N.J.

More specifically, polyamic acid or esters of polyamic acid examples that can be selected for the formation of a polyimide or a mixture of polyimides are prepared by the reaction of a dianhydride and a diamine. Suitable dianhydrides selected include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy) phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy) phenyl) sulfide dianhydride, di-(3,4-dicarboxyphenyl) methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3', 4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis (2,3-dicarboxyphenyl)methane dianhydride, bis(3,4-dicarboxyphenyl)methane dianhydride, 4,4'-(p-phenylenedioxy) diphthalic dianhydride, 4,4'-(m-phenylenedioxy)diphthalic dianhydride, 4,4'-diphenylsulfidedioxybis(4-phthalic acid) dianhydride, 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the polyamic acids include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, 2,2-di(p-aminophenyl)-1,1,1,3,3,3-hexafluoropropane, and the like, and mixtures thereof.

The dianhydrides and diamines are, for example, selected in a weight ratio of from about 20:80 to about 80:20, a weight ratio of from about 60:40 to about 40:60, and about a 50:50 weight ratio so that the symbols for "ratio" are uniform throughout paragraph.

Polyimide examples selected for the disclosed intermediate transfer member layer mixtures are represented by at least one of the following formulas/structures, and mixtures thereof where n represents the number of repeating segments of, for example, from about 5 to about 300, from about 10 to about 200, from about 20 to about 100, from about 20 to about 50, and from about 15 to about 45.

Fluoroaliphatic Phosphates

The fluoroaliphatic phosphates, which can function as a dispersing agent for the conductive components like carbon black when present, and as a leveling agent and release additive for the disclosed mixtures, can be represented by at least one of the following formulas/structures wherein $R_f$ is a perfluoroalkyl group represented, for example, by $C_nF_{2n+1}$ with n for $C_n$ being the number of carbon substituents, and more specifically, wherein n is from about 1 to about 18, from 1 to about 15, from 1 to about 10, from 1 to about 5, from about 5 to about 10, from about 2 to about 18, from about 2 to about 16, from about 2 to about 10, from about 3 to about 12, and from about 3 to about 8. Thus, for example, for the perfluoroalkyl group $C_nF_{2n+1}$ n for $F_n$ is a multiple of 2 of the n for the $C_n$ as disclosed herein.

Fluoroaliphatic phosphate examples selected for the disclosed intermediate transfer members include fluoroalkyl phosphates wherein alkyl contains from about 1 to about 18 carbon atoms, from about 1 to about 12 carbon atoms, from about 1 to about 10 carbon atoms, or from about 1 to about 8 carbon atoms, such as the perfluoroalkyl phosphate MASURF® FS-3300 (pH of 2 to 4) available from Mason Chemical Company, Arlington Heights, Ill.; the perfluorohexylethyl phosphate, THETAWET™ FS-8200 (pH of 2.5 to 4) available from Innovative Chemical Technologies, Incorporated, Cartersville, Ga.; and mixtures thereof.

For the fluoroalkyl phosphates, alkyl substituents comprise, for example, methyl, ethyl, propyl, butyl, pentyl, hexyl, heptyl, octyl, nonyl, decyl, mixtures thereof, and the like.

Specific examples of fluoroaliphatic phosphates selected for the disclosed intermediate transfer member mixture include a perfluorohexylethyl phosphate of the following formula/structure a perfluorooctylethyl phosphate, a di(perfluorohexylethyl) phosphate, a di(perfluorooctylethyl) phosphate, other suitable known fluoroaliphatic phosphates, mixtures thereof, and the like.

The fluoroaliphatic phosphates, which can simultaneously function as a release agent or additive, a leveling agent, and a dispersing agent in contrast to utilizing three different substances, are compatible with the disclosed coating solution mixture and the resulting polyimide/fluoroaliphatic phosphate containing mixtures or compositions, after curing, self-release from a metal substrate like stainless steel and a smooth polyimide/conductive component when present, fluoroaliphatic phosphate composition intermediate transfer member can be obtained Various amounts of a fluoroaliphatic phosphate can be selected for the intermediate transfer member composition or coating mixture, such as for example, from about 0.01 weight percent to about 10 weight percent (of the total solids throughout), from about 0.01 weight percent to about 5 weight percent, from about 0.1 weight percent to about 10 weight percent, from about 0.1 weight percent to about 0.5 weight percent, from about 0.1 weight percent to about 1 weight percent, from about 0.1 weight percent to about 0.9 weight percent, from about 0.1 weight percent to about 1.5 weight percent, from about 0.03 weight percent to about 0.4 weight percent, from about 0.03 weight percent to about 0.1 weight percent, from about 0.01 weight percent to about 0.5 weight percent, from about 0.01 weight percent to about 0.05 weight percent, and less than or equal to about 0.2 weight percent. In embodiments, the intermediate transfer member composition of the polyimide polymer and the fluoroaliphatic phosphate are present in a weight ratio of from about 99.99/0.01 to about 95/5 with the polyimide/conductive component/fluoroaliphatic phosphate weight ratio being, for example, from about 50/49.99/0.01 to about 94.9/5/0.1, about 94.9/0.11/5, about 94/5/1, about 94/8/5/0.2, or about 88.3/11.5/0.2, or for a mixture, such as a polyamic acid of biphenyl tetracarboxylic dianhydride/diaminobenzene, a polyamic acid of pyromellitic dianhydride/4,4-oxydianiline, carbon black and a fluoroaliphatic phosphate, the weight ratio is about 80/10/9/1, about 70/15/14.8/0.2, about 70.6/17.7/11.5/0.2, and other suitable ratios, such as from about 65/25/9.9/0.1 to about 80/8/11.9/0.1.

One specific disclosed intermediate transfer member coating comprises a mixture of a polyimide of biphenyl tetracarboxylic dianhydride/phenylenediamine, a conductive component, and the disclosed fluoroaliphatic phosphate prepared in a solvent illustrated herein from, for example, about 5 to about 20 percent by weight of solids, from about 5 to about 16 percent by weight of solids, from about 5 percent to about 10 by weight of solids, from about 10 to about 20 percent by weight of solids, and from about 10 to about 15 percent by weight of solids.

The disclosed polyimide/fluoroaliphatic phosphate containing mixture possesses, for example, a Young's modulus of from about 3,000 to about 10,000 MPa, from about 4,000 to about 9,000 MPa, from about 4,000 to about 8,000 MPa, from about 5,000 to about 8,000 MPa, and from about 7,000 to about 7,500 MPa.

Optional Conductive Components or Fillers

The disclosed intermediate transfer member may optionally contain one or more conductive components or fillers to, for example, alter and adjust the conductivity of the intermediate transfer member. Where the intermediate transfer member is a one layer structure, the conductive filler can be included in the mixture containing the fluoroaliphatic phosphates disclosed herein. However, where the intermediate transfer member is a multi-layer structure, the conductive filler can be included in one or more layers of the member, such as in the supporting substrate, the fluoroaliphatic phosphate containing mixture layer, or in both the supporting substrate and the fluoroaliphatic phosphate containing mixture layer and inclusive of the release layer when present. For example, suitable fillers include carbon blacks, metal oxides, polyanilines, graphite, acetylene black, fluorinated carbon blacks, other known suitable fillers, and mixtures thereof.

Examples of carbon black fillers that can be selected for the intermediate transfer members illustrated herein include Special Black 4 (B.E.T. surface area=180 m$^2$/g, DBP absorption=1.8 ml/g, primary particle diameter=25 nanometers) available from Evonik-Degussa, Special Black 5 (B.E.T. surface area=240 m$^2$/g, DBP absorption=1.41 ml/g, primary particle diameter=20 nanometers), color black FW1 (B.E.T. surface area=320 m$^2$/g, DBP absorption=2.89 ml/g, primary particle diameter=13 nanometers), color black FW2 (B.E.T. surface area=460 m$^2$/g, DBP absorption=4.82 ml/g, primary particle diameter=13 nanometers), color black FW200 (B.E.T. surface area=460 m$^2$/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation and carbon blacks available from Orion Chemicals, such as Special Black 4. Specific examples of conductive carbon blacks are BLACK PEARLS® 1000 (B.E.T. surface area=343 m$^2$/g, DBP absorption=1.05 ml/g), 880 (B.E.T. surface area=240 m$^2$/g, DBP absorption=1.06 ml/g), 800 (B.E.T. surface area=230 m$^2$/g, DBP absorption=0.68 ml/g), L (B.E.T. surface area=138 m$^2$/g, DBP absorption=0.61 ml/g), 570 (B.E.T. surface area=110 m$^2$/g, DBP absorption=1.14 ml/g), 170 (B.E.T. surface area=35 m$^2$/g, DBP absorption=1.22 ml/g), VULCAN® XC72 (B.E.T. surface area=254 m$^2$/g, DBP absorption=1.76 ml/g), XC72R (fluffy form of VULCAN® XC72), XC605, XC305, REGAL® 660 (B.E.T. surface area=112 m$^2$/g, DBP absorption=0.59 ml/g), 400 (B.E.T. surface area=96 m$^2$/g, DBP absorption=0.69 ml/g), 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and 1000 (B.E.T. surface area=343 m$^2$/g, DBP absorption=1.05 ml/g, primary particle diameter=16 nanometers); channel special carbon black 4 and channel special carbon black 5 available from Orion, and Channel carbon blacks available from Evonik-Degussa. Other known suitable carbon blacks not specifically disclosed herein may be selected as the filler or conductive component for the intermediate transfer members disclosed herein.

Examples of polyaniline fillers that can be selected for incorporation into the intermediate transfer members are PANIPOL™ F, commercially available from Panipol Oy, Finland; and known lignosulfonic acid grafted polyanilines. These polyanilines usually have a relatively small particle size diameter of, for example, from about 0.5 to about 5 microns; from about 1.1 to about 2.3 microns, or from about 1.5 to about 1.9 microns.

Metal oxide fillers that can be selected for the disclosed intermediate transfer members include, for example, tin oxide, antimony doped tin oxide, antimony dioxide, titanium dioxide, indium oxide, zinc oxide, indium-doped tin trioxide, indium tin oxide, and titanium oxide.

Suitable antimony doped tin oxide fillers include antimony doped tin oxides coated on an inert core particle, such as ZELEC® ECP-S, M and T, available from DuPont Chemicals, Jackson Laboratories, Deepwater, N.J., and those antimony doped non-core containing tin oxides, such as ZELEC® ECP-3005-XC and ZELEC® ECP-3010-XC; available from DuPont Chemicals, Jackson Laboratories, Deepwater, N.J. The core particle may be mica, $TiO_2$ or acicular particles having a hollow or a solid core.

Commercially available from E.I. DuPont or DuPont Chemicals examples of antimony doped tin oxide fillers are ZELEC® ECP 1610-S, 2610-S, 3610-S, 1703-S, 2703-S, 1410-M, 3005-XC, 3010-XC, 1410-T, 3410-T, S-X1, ZELEC® ECP powders that include an acicular hollow shell, an equiaxial titanium dioxide core product (ZELEC® ECP-T), and a plate shaped mica core product (ZELEC® ECP-M).

The antimony doped tin oxide particles can be prepared by densely layering a thin layer of antimony doped tin oxide onto the surface of a silica shell or silica-based particle, wherein the shell, in turn, has been deposited onto a core particle. Also, the antimony doped tin oxide particles are fine enough in size to provide adequate transparency. The silica may either be a hollow shell or layered on the surface of an inert core to form a solid structure.

When present, the filler can be selected in an amount of, for example, from about 0.1 to about 50 weight percent, from about 1 to about 60 weight percent, from about 1 to about 40 weight percent, from about 3 to about 40 weight percent, from about 4 to about 30 weight percent, from about 10 to about 30 percent, from about 10 to about 25 weight percent, from about 5 to about 30 weight percent, from about 15 to about 20 weight percent, and from about 5 to about 20 weight percent based on the total of the solid ingredients in which the filler is included.

Optional Polysiloxane Polymers

The intermediate transfer member disclosed mixtures can also generally comprise a polysiloxane polymer. Examples of polysiloxane polymers selected for the intermediate transfer member mixtures disclosed herein include known suitable polysiloxanes, such as a copolymer of a polyether and a polydimethylsiloxane, commercially available from BYK Chemical as BYK® 333, 330 (about 51 weight percent in methoxypropylacetate), and 344 (about 52.3 weight percent in xylene/isobutanol, ratio of 80/20); BYK®-SILCLEAN 3710 and 3720 (about 25 weight percent in methoxypropanol); a copolymer of a polyester and a polydimethylsiloxane, commercially available from BYK Chemical as BYK® 310 (about 25 weight percent in xylene), and 370 (about 25 weight percent in xylene/alkylbenzenes/cyclohexanone/monophenylglycol, ratio of 75/11/7/7); a copolymer of a polyacrylate and a polydimethylsiloxane, commercially available from BYK Chemical as BYK®-SILCLEAN 3700 (about 25 weight percent in methoxypropylacetate); a copolymer of polyester polyether and a polydimethylsiloxane, commercially available from BYK Chemical as BYK® 375 (about 25 weight percent in di-propylene glycol monomethyl ether); and mixtures thereof.

Specific examples of polysiloxane polymers comprise a polysiloxane polymer selected from the group consisting of a polyester modified polydimethylsiloxane, a polyether modified polydimethylsiloxane, a polyacrylate modified polydimethylsiloxane, and a polyester polyether modified polydimethylsiloxane.

The polysiloxane polymer, or copolymers thereof can be included in the disclosed coating compositions and intermediate transfer members thereof in an amount of, for example, from about 0.1 to about 10 weight percent, from about 0.01 to about 1 weight percent, from about 0.05 to about 1 weight percent, from about 0.05 to about 0.5 weight percent, from about 0.1 to about 0.5 weight percent, from about 0.2 to about 0.5 weight percent, or from about 0.1 to about 0.3 weight percent based on the total weight of the solid components or ingredients present.

Optional Supporting Substrates

When desired, a supporting substrate can be included in the intermediate transfer member, such as beneath the disclosed fluoroaliphatic phosphate containing mixture layer. The supporting substrate can be included to provide increased rigidity or strength to the intermediate transfer member.

The disclosed fluoroaliphatic phosphate containing coating dispersion can be applied on various suitable supporting substrate materials to form multilayer, such as dual layer intermediate transfer members. Exemplary supporting substrate materials include polyimides, polyamideimides, polyetherimides, mixtures thereof, and the like.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like. The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000, or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Specific examples of polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Optional Release Layers

When desired, an optional release layer can be included in the intermediate transfer member, such as in the configuration of a layer over the disclosed fluoroaliphatic phosphate mixture containing layer. The release layer can be included to assist in providing toner cleaning and additional developed image transfer efficiency from a photoconductor to the intermediate transfer member.

When selected, the release layer can have any desired and suitable thickness. For example, the release layer can have a thickness of from about 1 to about 100 microns, from about 10 to about 75 microns, or from about 20 to about 50 microns.

The optional release layer can comprise TEFLON®-like materials including fluorinated ethylene propylene copolymers (FEP), polytetrafluoroethylene (PTFE), polyfluoroalkoxy polytetrafluoroethylene (PFA TEFLON®), and other TEFLOW-like materials; silicone materials, such as fluorosilicones and silicone rubbers, such as Silicone Rubber 552, available from Sampson Coatings, Richmond, Va., polydimethyl siloxane/dibutyl tin diacetate, 0.45 gram DBTDA per 100 grams polydimethyl siloxane rubber mixture, with a weight average molecular weight $M_w$ of approximately 3,500; and fluoroelastomers, such as those available as VITON®, such as copolymers and terpolymers of vinylidenefluoride, hexafluoropropylene, and tetrafluoroethylene, which are known commercially under various designations as VITON® A, E, E60C, E45, E430, B910, GH, B50, and GF. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON® A; (2) a class of terpolymers of vinylidenefluoride, hexafluoropropylene, and tetrafluoroethylene, known commercially as VITON® B; and (3) a class of tetrapolymers of vinylidenefluoride, hexafluoropropylene, tetrafluoroethylene, and a cure site monomer, such as VITON® GF, having 35 mole percent of vinylidenefluoride, 34 mole percent of hexafluoropropylene, and 29 mole percent of tetrafluoroethylene with 2 percent cure site monomer. The cure site monomers can be selected from those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

Intermediate Transfer Member Preparation

The disclosed intermediate transfer member coating dispersions can be prepared by a number of known processes. One method for the preparation of the disclosed coating compositions involves mechanical stirring and with no ball milling, and where the fluoroaliphatic phosphate release additive/leveling agent/dispersing agent can be initially mixed with a conductive component like carbon black and a solvent. Subsequently, a polyamic acid or mixtures of polyamic acids can then be added to the mixture resulting.

More specifically, the disclosed intermediate transfer coating, such as an intermediate transfer belt (ITB) dispersion mixture, can be prepared in accordance with the following Scheme where a mixture of carbon black, the fluoroaliphatic phosphate combination release additive/leveling agent/dispersing component or agent contained in the disclosed solvents, such as NMP, can be stirred to form a slurry thereof. Subsequently, there can be added to the formed slurry a polyamic acid or mixtures thereof, followed by stirring, and where there results a polyamic acid/carbon black/fluoroaliphatic phosphate/NMP coating dispersion, which dispersion can then be filtered. In the Scheme that follows, the "add polyamic acid" encompasses a plurality of polyamic acids, such as a mixture of two polyamic acids.

Scheme

CARBON BLACK (CB)/FLUOROALIPHATIC PHOSPHATE (100/2) IN NMP

↓ MECHANICAL STIRRING 3 HOURS

CB/FLUOROALIPHATIC PHOSPHATE/NMP SLURRY

↓ ADD POLYAMIC ACID MECHANICAL STIRRING 18 HOURS

CB/POLYAMIC ACID/FLUOROALIPHATIC PHOSPHATE IN NMP COATING DISPERSION

↓ FILTRATION VIA 20 MICRON FILTER

FINAL ITB COATING DISPERSION.

The above prepared final intermediate transfer belt (ITB) liquid coating dispersion mixture can then be flow coated on a metal substrate like a stainless steel substrate, aluminum, nickel, copper, and alloys thereof, and glass plates and subsequently cured at 170° C. for 30 minutes and 320° C. for 120 minutes; or cured by heating from about 50° C. to about 75° C. for from about 25 to about 35 minutes, followed by heating at from about 180° C. to about 195° C. for from about 25 to about 35 minutes, and then further heating at from about 300° C. to about 325° C. for from about 50 to about 100 minutes. The resulting polyimide intermediate transfer member film with a flat configuration, and with no curl, after drying and cooling to room temperature, about 22° C. to about 25° C., readily released, without the assistance of any external processes, from the metal substrate. That is, the intermediate transfer member films obtained immediately release, or self-release, such as for example, within from about 1 to about 15 seconds, from about 1 to about 10 seconds, from about 5 to about 15 seconds, from about 5 to about 10 seconds, or about 1 second without any external assistance, from the metal substrate, such as a stainless steel substrate. Also, the efficiently and economically formed intermediate transfer member film will fully separate, such as for example, a separation of from about 90 to about 100 percent, or from about 95 to about 99 percent from metal substrates, and where release materials and separate release layers can be avoided.

The self-released disclosed intermediate transfer member film coating dispersion mixture can be selected as an intermediate transfer member or the film resulting can be coated on optional supporting substrates like those illustrated herein by flow coating, liquid spray coating, dip coating, wire wound rod coating, fluidized bed coating, powder coating, electrostatic spraying, sonic spraying, blade coating, molding, laminating, and the like. The optional supporting substrate can be formed in various shapes, such as a belt, or a film using suitable materials that are non-conductive or conductive with the thickness of the intermediate transfer member being, for example, from about 30 to about 1,000 microns, from about 100 to about 800 microns, from about 150 to about 500 microns, from about 100 to about 125 microns, or from about 75 to about 80 microns. In embodiments, the intermediate transfer film coating mixture subsequent to curing can have a thickness of, for example, from about 30 to about 400 microns, from about 15 to about 150 microns, from about 20 to about 100 microns, from about 50 to about 200 microns, from about 70 to about 150 microns, or from about 50 to about 75 microns.

A solvent can be included in the polyimide/fluoroaliphatic phosphate containing coating mixture. Examples of the solvents selected are, for example, toluene, hexane, cyclohexane, heptane, tetrahydrofuran, methyl ethyl ketone, methyl isobutyl ketone, N,N'-dimethylformamide, N,N'-dimethylacetamide, N-methyl pyrrolidone (NMP), methylene chloride, and mixtures thereof, where the solvent is selected in, for example, an amount of from about 70 weight percent to about 95 weight percent, or from 80 weight percent to about 90 weight percent based on the amounts of components in the coating mixture. The disclosed fluoroaliphatic phosphate is readily soluble in the aforementioned solvents, such that the solubility thereof ranges from about 90 to about 100 percent, that is completely 100 percent soluble, especially in the solvent NMP, from about 90 to about 99 percent, from about 95 to about 99 percent, and from about 98 to about 100 percent.

Specific embodiments will now be described in detail. These examples are intended to be illustrative, and not limited to the materials, conditions, or process parameters set forth in these embodiments. All parts are percentages by solid weight unless otherwise indicated.

Comparative Example 1

There was prepared an intermediate transfer belt (ITB) coating dispersion of a polyamic acid, which polyamic acid converts after curing by heating into the polyimide of biphenyl tetracarboxylic dianhydride/phenylenediamine of the following formula/structure wherein n is about 30.

More specifically, an intermediate transfer coating dispersion was prepared by providing a mixture of Special Carbon Black 4, available from Orion Chemicals, the polyamic acid of biphenyl tetracarboxylicdianhydride/phenylenediamine in N-methyl-2-pyrrolidone (NMP) (about 17 weight percent of solids), and not that readily soluble in the NMP solvent the leveling agent NOVEC™ FC-4432, a fluoro surfactant available from 3M, and which mixture was stirred and subjected to ball milling with 2 millimeter stainless steel shots via an Attritor grinding mill for 18 hours. There resulted a coating dispersion of the polyamic acid of biphenyl tetracarboxylicdianhydride/phenylenediamine/carbon black/leveling agent dispersed in NMP, where the weight ratio of polyamic acid of biphenyl tetracarboxylicdianhydride/phenylenediamine/carbon black/leveling agent was 88.8/11/0.2, and which dispersion was filtered with a 20 micron Nylon cloth filter.

The above prepared liquid coating dispersion was flow coated on a stainless steel substrate, and subsequently cured at 75° C. for 30 minutes, 190° C. for 30 minutes, and 320° C. for 60 minutes. The resulting polyimide containing intermediate transfer member, thickness of 50 microns, did not release from the stainless steel substrate until after soaking in water for about two months.

The carbon black particle size of the dispersion was measured to be about 150 nanometers with a narrow size distribution using a MALVERN HPPS5001 dynamic light scattering instrument.

Example I

There was prepared an intermediate transfer member belt (ITB) coating dispersion containing a mixture of polyamic acids comprised of a polyamic acid of biphenyl tetracarboxylic dianhydride/diaminobenzene and a polyamic acid of pyromellitic dianhydride/4,4-oxydianiline, which polyamic acids converted after curing with heating, into the polyimide of biphenyl tetracarboxylic dianhydride/phenylenediamine of the following formula/structure wherein n is from about 20 to about 50; and the polyimide of pyromellitic dianhydride/4,4'-oxydianiline of the following formula/structure wherein n is from about 15 to about 45.

The polyamic acid of biphenyl tetracarboxylic dianhydride/diaminobenzene is available from Kaneka Corporation (BPDE resin, about 16.9 weight percent solids in NMP), and the polyamic acid of pyromellitic dianhydride/4,4-oxydianiline selected for the blend was Pyre-M.L.® RC-5019 (about 16 weight percent solids in NMP) obtained from Industrial Summit Technology Corporation.

In the absence of milling, an intermediate transfer coating dispersion was prepared in accordance with the following scheme, and where there was initially generated a mixture of Special Carbon Black 4, available from Orion Chemicals, the fluoroaliphatic phosphate, MASURF® FS-3300 (pH of 2-4) available from the Mason Chemical Company, Arlington Heights, Ill., contained in the solvent NMP, about 16.9 weight percent solids or the fluoroaliphatic phosphate release additive/leveling agent/dispersing agent of the perfluorohexylethyl phosphate, THETAWET™ FS-8200 (pH of 2.5-4, contained in the solvent NMP, about 16 weight percent solids) available from Innovative Chemical Technologies, Incorporated, Cartersville, Ga. The mixture resulting was stirred for three hours to form a slurry thereof.

Subsequently, there was added to the formed slurry the above blend of the polyamic acid of biphenyl tetracarboxylic dianhydride/diaminobenzene and the above polyamic acid of pyromellitic dianhydride/4,4-oxydianiline, followed by stirring for 18 hours after which there resulted a dispersion of the polyimides of the above formulas/structures of biphenyl tetracarboxylicdianhydride/phenylenediamine and pyromellitic dianhydride/4,4-oxydianiline, carbon black/fluoroaliphatic phosphate/NMP coating dispersion, which dispersion was filtered with a 20 micron Nylon cloth filter. The polyamic acid dual blend/carbon black/fluoroaliphatic phosphate resulting dispersion had a weight ratio of 70.6/17.7/11.5/0.2 and where the fluoroaliphatic phosphate was about 99 percent soluble in the solvent NMP.

In the Scheme that follows, "add polyamic acid" refers to two polyamic acids.

The above prepared final liquid coating dispersion was flow coated on a stainless steel substrate, and subsequently cured at 170° C. for 30 minutes, and then 320° C. for 120 minutes, followed by drying to room temperature, about 25° C. The resulting intermediate transfer member polyimide/carbon black/fluoroaliphatic phosphate, thickness of 50 microns, with no curl or coating defects, self-released without the assistance of any external processes, in about 5 seconds, from the stainless steel substrate. Accomplishing self-release within a range of from about 1 to about 10 seconds is highly desirable.

The carbon black particle size of the dispersion was measured to be about 100 nanometers with a very narrow size distribution using a MALVERN HPPS5001 dynamic light scattering instrument.

Young's Modulus was measured following the known ASTM D882-97 process. Samples (0.5 inch×12 inch) of each intermediate transfer member were placed in a commercially available InstronTensile Tester measurement apparatus, and then the samples were elongated at a constant pull rate until breaking. During this time, there was recorded the resulting load versus the sample elongation. The Young's Modulus value was calculated by taking any point tangential to the initial linear portion of the recorded curve results and dividing the tensile stress by the corresponding strain. The tensile stress was calculated by dividing the load by the average cross sectional area of each of the test samples. The tensile stress at which the sample strip broke was recorded as break strength.

The above ITB members of Comparative Example 1 and Example I were measured for surface resistivity (averaging four to six measurements at varying spots, 72° F./65 percent room humidity) using a High Resistivity Meter (Hiresta-Up MCP-HT450 available from Mitsubishi Chemical Corporation). The following results were obtained

| Example Number | Young's Modulus (MPa) | Break Strength (MPa) | Surface Resistivity (ohm/square) |
|---|---|---|---|
| Comparative Example 1 | 6,000 | 163 | $5.6 \times 10^{10}$ |
| Example I | 7,050 | 200 | $3.2 \times 10^{10}$ |

The coating dispersion of Example I was prepared with no milling primarily because the disclosed fluoroaliphatic phosphate was an excellent dispersing agent for carbon black. In contrast, the Comparative Example 1 coating dispersion was effectively prepared by ball milling, which was a complex and energy-consuming process.

In addition, the resulting intermediate transfer member of Example I showed improved stability and mechanical properties, such as about 15 percent higher modulus, and an about 20 percent higher break strength, over the Comparative Example 1 intermediate transfer member.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprised of a polyimide, a fluoroaliphatic phosphate, and an optional conductive component, and wherein said fluoroaliphatic phosphate is of the following alternative formulas/structures wherein $R_f$ is a perfluoroalkyl of $C_nF_{2n+1}$ wherein n is a number of from about 1 to about 18.

2. The intermediate transfer member in accordance with claim 1 wherein said fluoroaliphatic phosphate is represented by the following formula/structure 3. The intermediate transfer member in accordance with claim 1 wherein said fluoroaliphatic phosphate is present in an amount of from about 0.1 to about 1 weight percent of total solids and wherein n is a number of from about 2 to about 16.

4. The intermediate transfer member in accordance with claim 1 wherein said polyimide is represented by at least one of the following formulas/structures wherein n represents the number of repeating segments of from about 20 to about 100.

5. The intermediate transfer member in accordance with claim 1 that further comprises a polysiloxane polymer selected from the group consisting of a polyester modified polydimethylsiloxane, a polyether modified polydimethylsiloxane, a polyacrylate modified polydimethylsiloxane, and a polyester polyether modified polydimethylsiloxane.

6. The intermediate transfer member in accordance with claim 1 wherein the polyimide and the fluoroaliphatic phosphate are present in a weight ratio of from about 99.99/0.01 to about 95/5, and optionally wherein said polyimide is represented by the following formula/structure wherein n represents the number of repeating segments of from about 20 to about 100.

7. The intermediate transfer member in accordance with claim 1 with a Young's modulus of from about 4,000 to about 8,000 MPa.

8. The intermediate transfer member in accordance with claim 1 wherein said conductive component is present, and is selected from the group consisting of carbon blacks, metal oxides, polyanilines, and mixtures thereof.

9. The intermediate transfer member in accordance with claim 1 wherein said conductive component is present and is carbon black, and said fluoroaliphatic phosphate functions as a dispersing agent for said carbon black.

10. The intermediate transfer member in accordance with claim 1 wherein said fluoroaliphatic phosphate is selected from the group consisting of perfluorohexylethyl phosphate, perfluorooctylethyl phosphate, di(perfluorohexylethyl) phosphate, di(perfluorooctylethyl) phosphate, and mixtures thereof.

11. The intermediate transfer member in accordance with claim 1 further including a release layer comprising at least one component selected from the group consisting of a fluorinated ethylene propylene copolymer, a polytetrafluoroethylene, a polyfluoroalkoxy polytetrafluoroethylene, a fluorosilicone, a terpolymer of vinylidene fluoride, hexafluoropropylene, and tetrafluoroethylene, and mixtures thereof.

12. The intermediate transfer member in accordance with claim 1 wherein said member self-releases from a supporting substrate of a metal subsequent to being deposited on said metal, and is capable of self-releasing from the supporting substrate in from about 1 to about 10 seconds.

13. The intermediate transfer member in accordance with claim 1 where said conductive component is present, and wherein the polyimide/conductive component/fluoroaliphatic phosphate weight ratio is from about 50/49.99/0.01 to about 94.9/5/0.1.

14. The intermediate transfer member in accordance with claim 1 wherein said fluoroaliphatic phosphate simultaneously functions as an internal release additive, a leveling agent, and a dispersing agent.

15. The intermediate transfer member in accordance with claim 1 further including a supporting substrate.

16. The intermediate transfer member in accordance with claim 1 wherein said fluoroaliphatic phosphate is a perfluorohexylethyl phosphate.

17. An intermediate transfer member comprising a layer comprised of a polyimide, carbon black, and a fluoroaliphatic phosphate of the following alternative formulas/structures wherein $R_f$ is a perfluoroalkyl of $C_nF_{2n+1}$ and wherein n is a number of from about 1 to about 18.

18. The intermediate transfer member in accordance with claim 17 wherein n is a number of from about 1 to about 10.

19. The intermediate transfer member in accordance with claim 17 wherein said fluoroaliphatic phosphate is represented by the following formula/structure wherein n is a number of from about 3 to about 12.

20. The intermediate transfer member in accordance with claim 17 wherein said fluoroaliphatic phosphate is represented by the following formula/structure wherein n is a number of from about 2 to about 16.

21. An intermediate transfer member comprising a supporting substrate, and a layer thereover comprised of a mixture of a polyimide generated from a polyamic acid or mixtures thereof, carbon black, and a fluoroaliphatic phosphate selected from a group consisting of perfluorohexylethyl phosphate, perfluorooctylethyl phosphate, di(perfluorohexylethyl) phosphate, di(perfluorooctylethyl) phosphate, and mixtures thereof, and wherein said member optionally possesses a Young's modulus of from about 5,000 to about 8,000 MPa.

* * * * *